United States Patent Office 3,801,603
Patented Apr. 2, 1974

3,801,603
PROCESS FOR THE PREPARATION OF
6-HYDROXY CHROMANS
Peter Hartmann, Cologne, Stammheim, and Ernst Roos, Cologne, Flittard, Germany, assignors to Bayer Aktiengesellschaft, Leverkusen, Germany
No Drawing. Filed Jan. 6, 1972, Ser. No. 215,908
Claims priority, application Germany, Jan. 14, 1971, P 21 01 480.2
Int. Cl. C07d 7/20
U.S. Cl. 260—345.5       8 Claims

ABSTRACT OF THE DISCLOSURE 6-hydroxy chromans are prepared by reacting a hydroquinone with a 1,3-diene in a two-phase aqueous mineral acid/hydrocarbon solvent system at an elevated temperature, continuously removing a portion of the organic solvent phase during the reaction, evaporating solvent contained therein and returning same to the reaction mixture, and isolating the 6-hydroxy chroman formed.

BACKGROUND 6-hydroxy chromans and their alkyl substitution products are valuable antioxidants, e.g. for stabilizing polyurethane foam resins. Methods for the preparation of these compounds from hydroquinone and 1,3-dienes or 1,3-diols which can be converted into 1,3-dienes or unsaturated alcohols are also already known (Friedel-Crafts and Related Reactions. G. Olah, ed., Interscience Publishers, New York, 164, Chap. 15). The conversion is normally carried out in the presence of a Friedel-Crafts catalyst in an aliphatic, aromatic or halo-substituted hydrocarbon as a solvent but this method provides high yields only if tri-substituted hydroquinones are used, and, if the method is carried out with hydroquinone itself or with hydroquinones which have more than one free orthoposition, considerable difficulties are encountered which have so far prevented the use of the known process on a technical scale. The following are some of the serious disadvantages of this method.

Mono- and di-alkylated hydroquinones and especially hydroquinone itself are only slightly soluble in the usual solvents suitable for Friedel-Crafts alkylation processes so that a relatively large quantity of the solvent is required and the reaction time is correspondingly long. In addition, a considerable proportion of higher substituted compounds are formed. In order to obtain an acceptable yield of the 6-hydroxy-chroman, it is therefore necessary to stop the reaction before all of the starting material has undergone reaction. Furthermore, it is advisable to remove the catalyst immediately in order to prevent subsequent alkyl interchange reactions.

Isolation of the resulting 6-hydroxy chromans from the reaction mixture consisting of the starting material, the catalyst, the desired product and higher alkylated compounds requires operations which involve considerable expenditure and loss. For these reasons, the yields are low.

SUMMARY

It has now been found that a high yield of a 6-hydroxy chroman can easily be obtained with a high degree of purity by reacting a hydroquinone in a two-phase system consisting of an organic solvent and an aqueous mineral acid and at the same time continuously removing the resulting 6-hydroxy chroman from the reaction mixture.

This invention, therefore, relates to a process for the preparation of 6-hydroxy chromans having the following general formula:

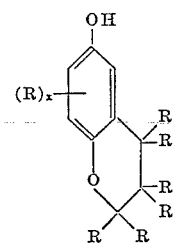

in which

R represents hydrogen atoms or identical or different alkyl radicals containing from 1 to 4 carbon atoms, and
x represents 0, 1, 2 or 3, characterized in that a hydroquinone of the following general formula:

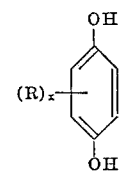

wherein R and x are as just defined, is reacted with a 1,3-diene in a two-phase system consisting of a more than catalytic quantity of an aqueous mineral acid and a hydrocarbon as an organic solvent at an elevated temperature, part of the organic phase is continuously removed during the reaction, the solvent contained therein is evaporated off and returned to the reaction mixture, and a 6-hydroxy chroman is isolated.

DESCRIPTION

The preferred hydroquinones are those in which R is an alkyl group having one or two carbon atoms and x=0, 1 or 2. The preferred dienes are isoprene, butadiene and dimethyl butadiene.

The aqueous mineral acid used is preferably phosphoric acid in a concentration of from 60 to 90% by weight, optionally with the addition of from 10 to 20% of sulphuric or polyphosphoric acid which is at a concentration of from 60 to 90% by weight (remainder water). The mineral acid preferably used is 85% by weight orthophosphoric acid. The mineral acid should be used in a quantity at least equal to the quantity of the hydroquinone used and should dissolve most of the hydroquinone. The quantity of the aqueous mineral acid is preferably 1 to 3 times the quantity of hydroquinone (in parts by weight).

The organic solvents used are aliphatic, aromatic and/or aralipatic solvents having a boiling range of from 70° C. to 150° C., preferably from 90° C. to 110° C.

The quantity of the organic solvent used is at least equal to the quantity and even up to 20 times the quantity of the mineral acid; it is preferably 12 to 16 times the quantity of the mineral acid (in parts by weight).

The reaction temperature is from 70° C. to 150° C. but preferably from 10 to 20° C. below the boiling point of the solvent used. The preferred temperature range is from 90° C. to 110° C. The following are mentioned as examples of suitable solvents:

benzene, toluene, xylene, cleaning petrol (boiling range 70 to 150° C.), cyclohexane and chlorobenzene.

The process according to the invention affords the following advantages over the processes previously known: The use of a diphasic system of an organic solvent and an aqueous mineral acid in which the acid phase serves both as a catalyst and as a solvent enables even water-soluble hydroquinones and especially hydroquinone itself to be directly and rapidly converted into 6-hydroxy chromans. The method according to the invention leads directly to a very pure product. Complicated working up processes can be completely dispensed with. The yields are generally considerably higher than those obtained by the conventional processes and are in many cases more than 90%. The process according to the invention may, of course, also be carried out continuously.

The temperatures indicated in the following examples are in degrees centigrade.

Example 1

A suspension of 110 g. (1 mol) of hydroquinone in 1000 ml. of toluene is prepared in a modified 2-liter Kutscher-Steudel apparatus (described in "Methoden der Organischen Chemie," Houben Weyl, volume I/1, page 307, G. Thieme Verlag Stuttgart 1958) equipped with a reflux cooler, stirrer, gas inlet tube and an attached 2-liter distillation flask. A mixture of 220 ml. of 85% ortho-phosphoric acid and 25 ml. of concentrated sulphuric acid is introduced dropwise into the suspension at 90° with stirring. When most of the hydroquinone has gone into solution, the apparatus is filled with 1800 ml. of toluene, and butadiene is introduced into the mixture at 100°. The reaction mixture is stirred in such a manner that the aqueous phase is vigorously mixed but the overlying organic phase is only mildly mixed. The temperature in the distillation flask is adjusted to from 160 to 170° (bath temperature) in order to effect rapid extraction of the reaction product from the diphasic system. All the hydroquinone has undergone reaction in about 3 hours (butadiene consumption 71 g. (1.5 mol)). The mixture is extracted for a further hour and the extract is then concentrated by evaporation and the residue distilled in a high vacuum. 2-methyl-6-hydroxy chroman is obtained.

B.P.: 115 to 125°/0.5 mm. Hg, yield: 116 g. (71% of the theory).

Example 2

110 g. (1 mol) of hydroquinone are reacted as in Example 1 with 68 g. (1 mol) of isoprene in the presence of 200 ml. of 85% ortho-phosphoric acid in 2500 ml. of toluene at 95°.

28 g. of hydroquinone with a sharp melting point are recovered from the extract on cooling. Crystallization from the filtrate after evaporation and trituration of the residue with cyclohexane yields 121 g. (91% of the theory) of 2,2-dimethyl - 6 - hydroxy chroman. M.P.: 73° C.

Similar results are obtained when the reaction is carried out in cleaning petrol or xylene instead of toluene at 100 to 105°.

Example 3

A suspension of 110 g. (1 mol) of hydroquinone, 2000 ml. of toluene and 200 ml. of 85% ortho-phosphoric acid is prepared as described in Example 1, and 100 g. (1.22 mol) of dimethyl butadiene dissolved in 400 ml. of toluene are introduced dropwise directly into the acid phase at 95°. 18 g. of pure hydroquinone are obtained from the extract on cooling, and from the filtrate after evaporation and distillation there are obtained 136 g. (85% of the theory) of 2,2,3 - trimethyl - 6 - hydroxy chroman as a colorless oil.

B.P.: 130 to 137°/1.2 mm. Hg.

Example 4

62 g. (6.5 mols) of methyl hydroquinone are reacted as described in Example 1 with 41 g. (0.6 mol) of isoprene in the presence of 150 ml. of 85% ortho-phosphoric acid at 95° in cleaning petrol.

28 g. of the starting material are obtained from the extract on cooling. Evaporation of the filtrate and distillation in a high vacuum yields 50 g. (95% of the theory) of isomeric trimethyl - 6 - hydroxy chromans consisting of 2,2,5 - trimethyl - 6 - hydroxy chroman, 2,2,7 - trimethyl - 6 - hydroxy chroman and 2,2,8 - trimethyl - 6-hydroxy chroman in the form of a colorless oil, B.P.: 112°/0.8 mm. Hg.

Example 5

69 g. (0.5 mol) of 2,3-dimethyl hydroquinone are reacted with 41 g. (0.6 mol) of isoprene as described in Example 1 in the presence of 150 ml. of 85% ortho-phosphoric acid at 95° in cleaning petrol.

80 g. (78% of the theory) of 2,2,7,8 - tetramethyl-6-hydroxy chroman, M.P. 84 to 85° crystallize from the extraction residue after trituration with petroleum ether.

2,2,5,7 - tetramethyl - 6 - hydroxy chroman, M.P. 78 to 80°, is obtained in the same way from 2,5-dimethyl hydroquinone.

What is claimed is:

1. Process for preparing 6-hydroxy chroman having the formula

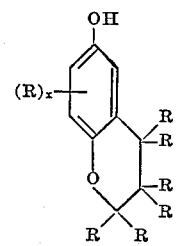

wherein

R is selected from the group of hydrogen and alkyl having one or two carbon atoms; and
x is 0, 1 or 2;

which comprises reacting a hydroquinone having the following formula:

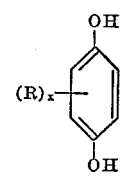

wherein

R and x are as defined above, with a 1,3-diene selected from the group consisting of isoprene, butadiene and dimethyl butadiene in a two phase system consisting of a more than catalytic quantity of an aqueous mineral acid and a hydrocarbon as an organic solvent at an elevated temperature; continuously removing part of the organic phase during the reaction, evaporating the solvent contained and returning same to the reaction mixture; and isolating the 6-hydroxy chroman formed.

2. Process of claim 1 wherein the aqueous mineral acid is a phosphoric acid.

3. Process of claim 2 wherein the aqueous mineral acid is from 60 to 90% by weight phosphoric acid which may contain an addition of from 10 to 20% of sulphuric or polyphosphoric acid at a concentration of from 60 to 90% by weight.

4. Process of claim 2 wherein the mineral acid is 85% by weight ortho-phosphoric acid.

5. Process of claim 1 wherein the reaction is carried out at a temperature of from 70 to 150° C.

6. Process of claim 5 wherein the reaction is carried out at a temperature of from 90 to 110° C.

7. Process of claim 1 wherein the aqueous mineral acid is used in a quantity of from one to three times the quantity by weight of the hydroquinone.

8. Process of claim 1 wherein the organic solvent is selected from the group of benzene, toluene, xylene, cyclohexane and a petroleum hydrocarbon fraction boiling in the range of from 70° C. to 150° C.

References Cited

UNITED STATES PATENTS

| | | | |
|---|---|---|---|
| 2,320,746 | 6/1943 | Paul | 260—345.5 |
| 3,476,772 | 11/1969 | Hoyle et al. | 260—345.5 |

JOHN M. FORD, Primary Examiner

U.S. Cl. X.R.

252—407; 260—45.8 A